April 25, 1967  M. V. NELSON  3,316,371
CENTRIFUGALLY OPERATED SWITCH WITH RACK AND
PINION MICRO-SWITCH ADJUSTING MEANS
Filed June 30, 1965  2 Sheets-Sheet 1
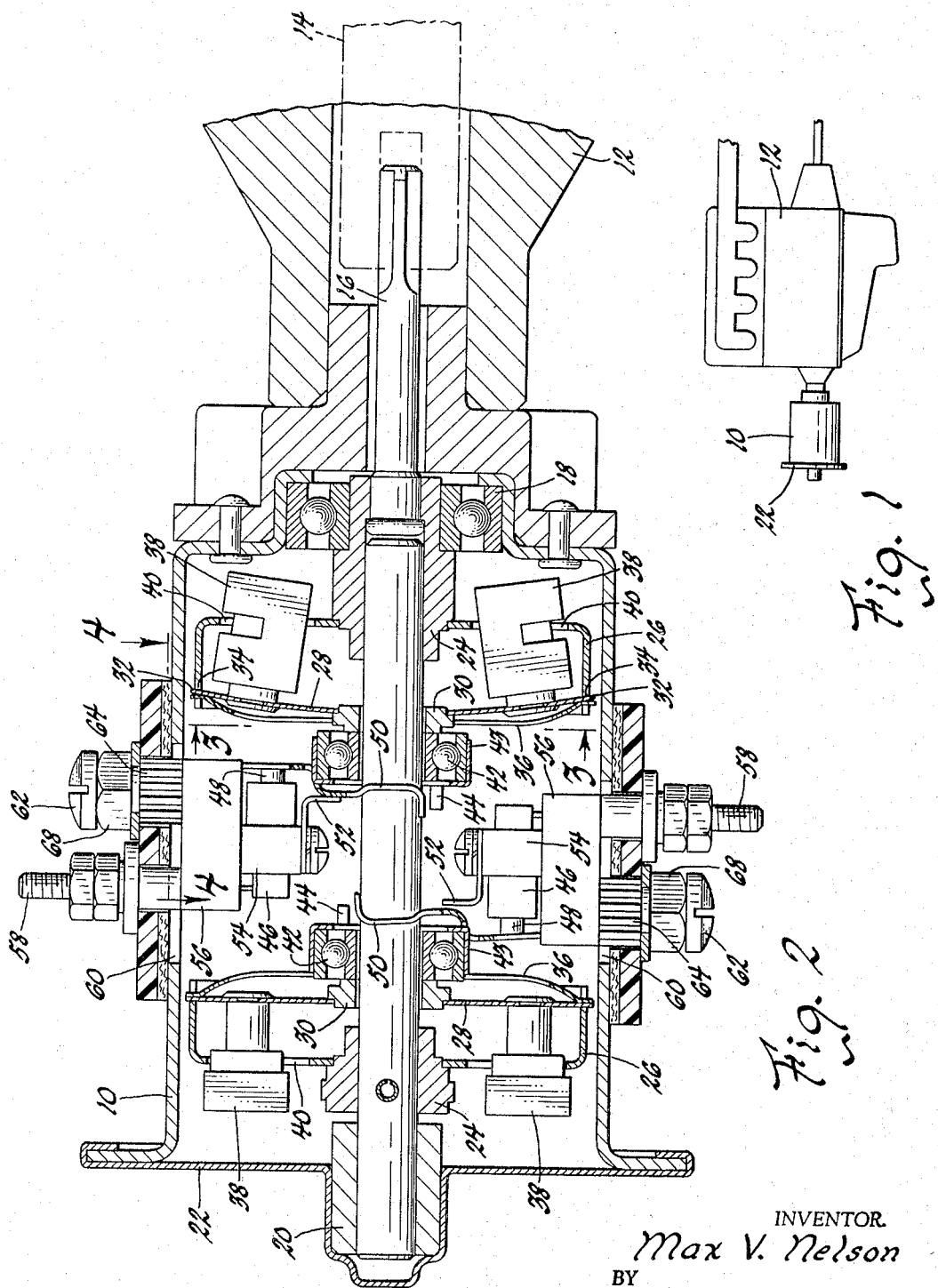
INVENTOR.
Max V. Nelson
BY
Donald P. Selverki
HIS ATTORNEY April 25, 1967

M. V. NELSON 3,316,371

CENTRIFUGALLY OPERATED SWITCH WITH RACK AND
PINION MICRO-SWITCH ADJUSTING MEANS

Filed June 30, 1965

INVENTOR.
Max V. Nelson
BY
Donald P. Selvecki

HIS ATTORNEY

United States Patent Office 3,316,371
Patented Apr. 25, 1967

3,316,371
CENTRIFUGALLY OPERATED SWITCH WITH RACK AND PINION MICRO-SWITCH ADJUSTING MEANS
Max V. Nelson, Flint, Mich., assignor to General Motors Corporation, Detroit, Mich., a corporation of Delaware
Filed June 30, 1965, Ser. No. 468,463
3 Claims. (Cl. 200—80)

This invention relates to electric switches and more particularly to an electric switch responsive to the rotational speed of associated mechanism.

It is an object of the present invention to provide an improved speed sensitive switch which is responsive to a force generated by rotating weights.

It is another object of the present invention to provide an improved speed sensitive switch is easily adjustable as to the speed at which it becomes responsive.

It is still another object of the present invention to provide an improved electric switch which is arranged to open or close an electrical circuit when a rotational speed of associated mechanism reaches certain predetermined levels.

It is a further object of the present invention to provide an improved speed sensitive switch adaptable for mounting with other similar speed sensitive switches and responsive to the rotation of a common drive shaft to selectively energize and deenergize electrical circuits during various speed ranges of the drive shaft.

It is yet a further object of the present invention to provide an improved speed sensitive switch which utilizes radially moving weights to generate a force in an axial direction to selectively energize and deenergize a switch.

Further objects and advantages of the present invention will be apparent from the following description, reference being had to the accompanying drawings wherein a preferred embodiment of the present invention is clearly shown.

In the drawings:

FIGURE 1 is an elevational view of the subject invention shown in a typical operative environment;

FIGURE 2 is a sectional view of one embodiment of the subject invention;

Figure 3:
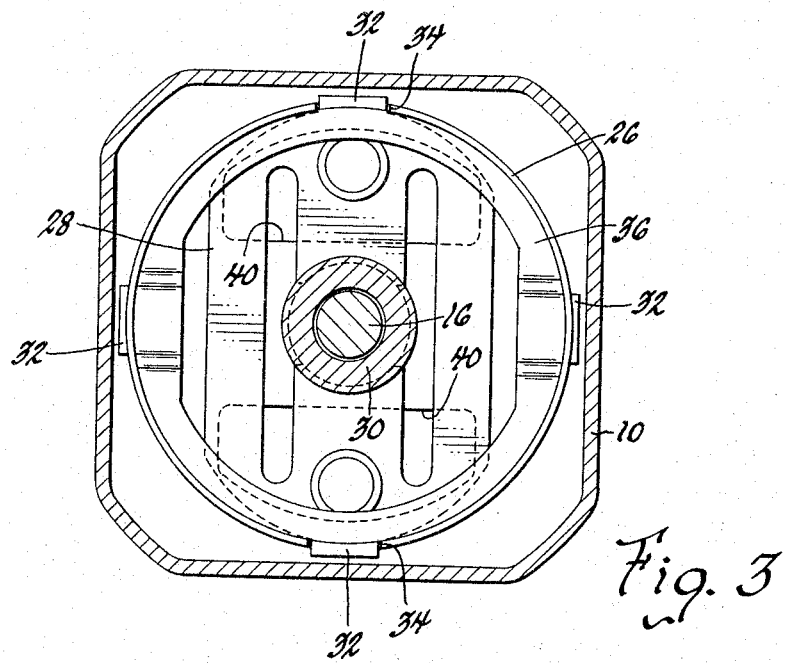
FIGURE 3 is a sectional view taken along line 3—3 of FIGURE 2.

Referring to FIGURE 1, a housing 10 containing a speed sensitive switch to be hereinafter described is shown mounted on an internal combustion engine 12, the rotational speed of which the speed sensitive switch will be responsive.

Referring to FIGURE 2, an output member 14 from the engine 12 is keyed to a drive shaft 16 in a conventional manner. Drive shaft 16 is rotatably carried by a bearing 18 which in turn is carried by housing 10. Therefore, the drive shaft 16 rotates relative to the housing 10. An opposite end of the drive shaft 16 is carried for rotation by a sleeve bearing 20 in turn carried by a closure member 22 of the housing 10.

A sleeve 24 carried in fixed relationship with respect to drive shaft 16 carries a cup 26 for rotation therewith. A resilient plate 28 engages a sleeve 30 slidably disposed on the shaft 16 and engages the cup 26 by the cooperation of tangs 32 formed on the outer periphery of the resilient plate 28 with slots 34 formed in the cup 26. The cooperation of the tangs 32 and the slots 34 is better seen in FIGURE 3. A resilient clip ring 36 bears against resilient plate 28 and serves to hold the resilient plate 28 firmly against the ends of slots 34. A series of weights 38 firmly engage the resilient plate 28 and project through access ports 40 formed in the cup 26.

Sleeve 30 is carried by a bearing 42 which includes a portion 43 held in fixed relationship with the housing 10 laterally but includes a lug 44 cooperating with a foot of actuator 50 to allow axial movement thereof relative to the shaft 16.

A switching means 46 is adjustably carried by the housing 10. The switch 46 is a push button type having a spring loaded push button actuator 48 similar to a common limit switch. Push button 48 is normally kept depressed by a force exerted by a pivotally suspended actuator 50 bearing against push button 48 and in turn held at its free end by the force of the resilient plate 28. It is noted that the resilient plate 28 is in a bowed configuration during periods of operation when the drive shaft 16 is below the responsive speed. A stop 52 carried by switch 46 serves as a stop for locating the static position of bearing 42.

A support member 56 carrying the switching means 46 includes terminals 58 engaging electrical leads to the switching means 48. The entire support 56 is movable in a slot 60 formed in the outer wall of the housing 10. A pivotable adjusting nut 68 is adapted to freely rotate on screw 62 and includes a gear or pinion portion 64.

Figure 4:
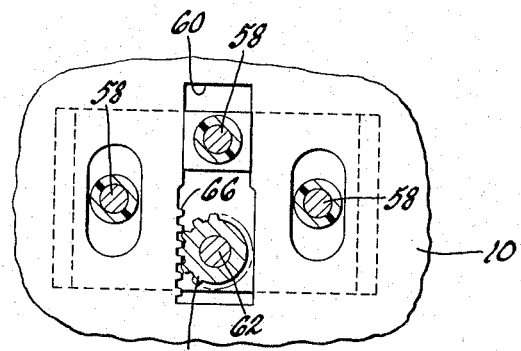
FIGURE 4 is a sectional view taken along line 4—4 of FIGURE 2.

Referring to FIGURE 4, the nut 68 with its gear portion 64 is illustrated as cooperating with a rack 66 formed along one edge of slot 60. It is therefore seen that a rotating motion of the nut 68 will result in a rack and pinion cooperation between portion 64 and rack 66, thereby providing an adjusting means for support member 56 relative to slot 60. Screw 62, better seen in FIGURE 2, draws the support member 56 tightly against the underside of housing 10 to prevent further movement of the support member 56 after an adjustment has taken place.

Referring to FIGURE 2, another support member and switching means is illustrated in inverted disposition but it is understood that this mechanism is identical to switching means 46 and support member 56 just described. The two are shown in juxtaposition to one another to illustrate the adaptability of the subject device to be operated in series, thereby causing the operation of electrical switches during different speed ranges of the drive shaft 16. It is noted that the weights in this other unit are differently disposed to illustrate the configuration that the associated mechanism will assume in the actuated condition. It is noted in this portion of FIGURE 2 that weights 38 have swung outwardly as they would when the speed range to which the switch mechanism is responsive has been attained.

In operation, drive shaft 16 is rotated by a power source such as an engine 12 whose rotational speed is to be monitored. As drive shaft 16 is rotated with increasing speed, weights 38 carried by the resilient plate 28 will swing outwardly toward housing 10. Depending on the design characteristics and the positioning of stop 52 relative to actuator 50, the radially moving weights 38 will tend to straighten the resilient plate 28 from its normally bowed disposition. The center portion of the plate 28 is effectively levered toward the weights 38 and sleeve 30 is drawn axially along shaft 16. The inherent resilience of push button 48 will drive actuator 50 along behind the axially moving sleeve 30. At some predetermined point, push button 48 will be fully extended, thereby tripping switching means 46. It is understood that switching means 46 is spring loaded to either an ON or OFF position as desired and, at a predetermined rotational speed of shaft 16, will be freed for operation. As long as the critical rotational speed of shaft 16 is maintained, the weights 38 will hold plate 28 in a straightened configuration, thereby leaving push button 48 in its free position. As the rotational speed of shaft 16 decreases, weights 38 will swing back in toward shaft 16 due to the inherent resiliency of plate 28, thereby repositioning sleeve 30 and driving actuator 50 against push button 48. When push button 48 is again depressed, the electrical function previously carried out is reversed and the speed sensitive switch is poised in its static configuration.

It should be noted that the embodiment of the subject invention shown in FIGURE 2 illustrates two speed sensitive switches in the same housing. Any number of switches could be mounted on shaft 16 and made to be responsive to the rotational speed thereof. It is understood that the responsive rotational speed of the switches can be varied in many ways. During design thereof, the speed sensitive range can be controlled by increasing or decreasing the resiliency of plate 28, by increasing or decreasing the mass of weights 38, or by varying the size of cup 26. After an installation has been completed, the response range of the speed sensitive switches can be varied externally by the previously described adjustment of the rack and pinion arrangement resulting in a varying of the static load of the resilient plate 28 acting on actuator 50.

The varying of the speed responsive ranges adds to the utility of the subject device by making possible the operation of electrical equipment during a certain speed range, which equipment can be deenergized above and below the predetermined speed range. For example, one set of weights could be so constructed as to open an electrical circuit at one point during an increasing rotational speed of shaft 16 and later deenergizing the circuit previously energized by having a second set of weights responsive to a higher rotational speed of shaft 16. Many electrical functions can be brought about by use of one or more speed sensitive switches operating on the same or separate drive shafts, resulting in an efficient monitoring of the speed of a power source throughout all speed ranges.

While the embodiment of the present invention, as herein disclosed, constitutes a preferred form, it is to be understood that other forms might be adopted.

What is claimed is as follows:

1. A speed sensitive switch comprising: a housing; a drive shaft rotatably supported at several points in said housing, said drive shaft being driven by a power source to which the speed sensitive switch is responsive; resilient means slidably carried on said drive shaft and rotating therewith, said resilient means slidable axially on said drive shaft; weights carried by said resilient means and mounted thereon to be deflectable radially from said drive shaft as said drive shaft attains several certain predetermined rotational speeds; switches carried by said housing and each including a pivotable actuator therefor suspended from said housing and circumferentially disposed around said drive shaft in spaced relationship thereto; a slide formed as a portion of said resilient means and axially shiftable on said drive shaft as said weights deflect radially during certain speed ranges thereby allowing said pivotable actuator of said switch to selectively free the switch for operation; and adjusting means including a slot formed in said housing, said slot having a rack formed along a side thereof, and a pinion carried by said switch means engaging said rack to provide an adjusting means for varying the position of said switch means relative to the first portion of said first means.

2. A speed sensitive switch according to claim 1 wherein said switch includes a spring loaded button actuator normally held in a depressed position by a force from said resilient means acting through said slide against said pivotable actuator and energizable by a sliding axial movement of said slide when a predetermined speed is reached by said drive shaft.

3. A speed sensitive switch comprising: a housing; drive means rotatably driven by a power source whose speed is monitored, said drive means carried by said housing and being rotatable with respect thereto; first means including weights carried by said drive means, said weights being radially deflectable on said first means with respect to said drive means as the drive means rotates; said first means having a first portion axially movable on said drive means in response to radial movement of said weights; a plurality of switch means carried by said housing and adjustably mounted with respect to said first portion of said first means from a point external to said housing; and lever means pivotally supported by said switch means in juxtaposition to said first portion of said first means, said lever means positioned to selectively energize and deenergize said switch means in response to axial movement of said first portion as said drive means rotates in certain predetermined speed ranges, said switch means being slidably disposed in a slot formed in said housing, said slot having a rack formed along a side thereof, and a pinion carried by said switch means and engaging said rack to provide an adjusting means for varying the position of said switch means relative to the first portion of said first means.

References Cited by the Examiner

UNITED STATES PATENTS

| 2,416,973 | 3/1947 | Wright | 200—80 |
| 2,616,682 | 11/1952 | Greenhut | 200—80 X |
| 2,720,563 | 10/1955 | Williams | 200—80 |
| 2,748,219 | 5/1956 | Buchanan | 200—153 X |
| 2,926,899 | 3/1960 | Gaubatz | 200—80 |
| 2,991,655 | 7/1961 | Jorgensen et al. | 200—80 |
| 3,013,133 | 12/1961 | Seyfried et al. | 200—80 |
| 3,154,650 | 10/1964 | Brucken et al. | 200—80 |

BERNARD A. GILHEANY, *Primary Examiner.*

H. A. LEWITTER, *Assistant Examiner.*